United States Patent

[11] 3,634,764

[72] Inventor: Raymond W. Sargent
       Bristol, Vt.
[21] Appl. No.: 724,087
[22] Filed: Apr. 25, 1968
[45] Patented: Jan. 11, 1972
[73] Assignee: Simmonds Precision Products, Inc.
       Tarrytown, N.Y.

[54] FLAT SCALE RECTILINEAR INDICATOR
     2 Claims, 3 Drawing Figs.

[52] U.S. Cl. .................................................... 324/132, 324/99 R
[51] Int. Cl. ...................................................... G01r 15/10, G01r 17/06
[50] Field of Search ....................................... 338/165, 176, 177, 178, 179, 180, 181, 182, 183; 74/86, 89, 89.18, 89.19; 324/99, 100, 157, 132

[56] References Cited
UNITED STATES PATENTS

| 399,292 | 3/1889 | Siemens | 324/99 |
| 2,423,617 | 7/1947 | Rath | 324/99 X |
| 3,479,591 | 11/1969 | Mathews | 324/99 |
| 1,943,358 | 1/1934 | Ackerman | 74/89.19 |
| 1,555,908 | 10/1925 | Burkhart | 324/99 |
| 1,938,396 | 12/1933 | Megow | 338/165 X |
| 3,196,347 | 7/1965 | Moyano | 324/99 |

FOREIGN PATENTS

| 1,102,273 | 3/1961 | Germany | 324/132 |

Primary Examiner—Rudolph V. Rolinec
Assistant Examiner—Ernest F. Karlsen
Attorney—Edwin E. Greigg ABSTRACT: A flat scale indicating device for use with servo units having feedback loops, having an indicator arm pivotally mounted to a sector gear, the latter being in meshing engagement with a rotary pinion for transmitting rotary motion of the pinion to a straight line translatory motion at the pointer end of the indicating arm. The indicator arm further functions as a potentiometer wiper and an electrical connection is provided between the arm and a suitable amplifier bridge circuit.

PATENTED JAN 11 1972　　　　　　　　　　　　3,634,764

INVENTOR
RAYMOND W. SARGENT

BY *Edwin E. Greigg*
ATTORNEY

FLAT SCALE RECTILINEAR INDICATOR

This invention relates to indicators for either vertical or horizontal movement along a flat dial surface wherein the rotary motion of an output shaft of a torque motor in a servo unit is converted to the straight line motion of an indicator.

Ordinarily, the conventional scale mounted on the front face of a servo unit is convex, such as shown and described in Alfred D. Gronner's application Ser. No. 472,520, having the same assignee as the present case. In such cases the convex front face of the servo unit accommodates arcuate movement of the pointer pivoted within the housing behind the scale. When viewing the ends of the scale from a central position, the spaces between the indicia become distorted to the observer because the plane of the scale at its ends is not substantially normal to the line of sight of the observer. As a result, parallax and reading errors associated with curved dials have become common with meter-type movements of this kind. It is the purpose of this invention to overcome the above-mentioned difficulties and provide a flat dial surface along which the indicator may move in a straight line in response to a rotary motion being measured within a servo unit.

Accordingly, it is an object of this invention to provide a flat dial indicator which provides effective readability at elevations other than eye level as well as at different angles to the dial surface.

It is another object of this invention to provide a servo-type instrument employing a dial pointer in which a linkage system converts rotary motion to a true straight line harmonic motion, the latter being a relatively large reciprocating output stroke developed in a relatively short guideway.

It is yet another object of this invention to provide a servo-type instrument in which two revolutions of a motor shaft correspond to a full scale displacement of the pointer resulting in low motor inertia and minimum overshoot and hunting tendency.

It is yet another object of this invention to provide a servo-type instrument employing a card-type feedback potentiometer providing a linear dial display.

It is still yet another object of this invention to provide a servo-type instrument employing a feedback loop in which the dial pointer and feedback potentiometer are in close proximity to each other, such that a minimum of lost motion is encountered in the mechanical linkage and gearing and in which only negligible inaccuracies are introduced.

According to one aspect employing the principles of this invention, there is provided a compact servo unit employing a torque motor or the like having a pinion mounted on its output shaft meshing with a gear sector oscillating through a given operating angle. Located on the gear sector and in close proximity to the gear teeth is a crankpin carrying a pointer arm, one end of which has a lost-motion connection with a fixed pin, the other end of which has attached thereto a thin tapered strip of conductive material that serves the dual function of a dial pointer and a potentiometer wiper. Rotation of the pinion provides a cranking motion imparted to the pointer arm through a given angle, and in a relatively short guideway a reciprocating output stroke is achieved approaching that of a true straight line in true harmonic motion.

Other objects and advantages will become apparent from the following study of the specification and drawings, in which.

Figure 1:
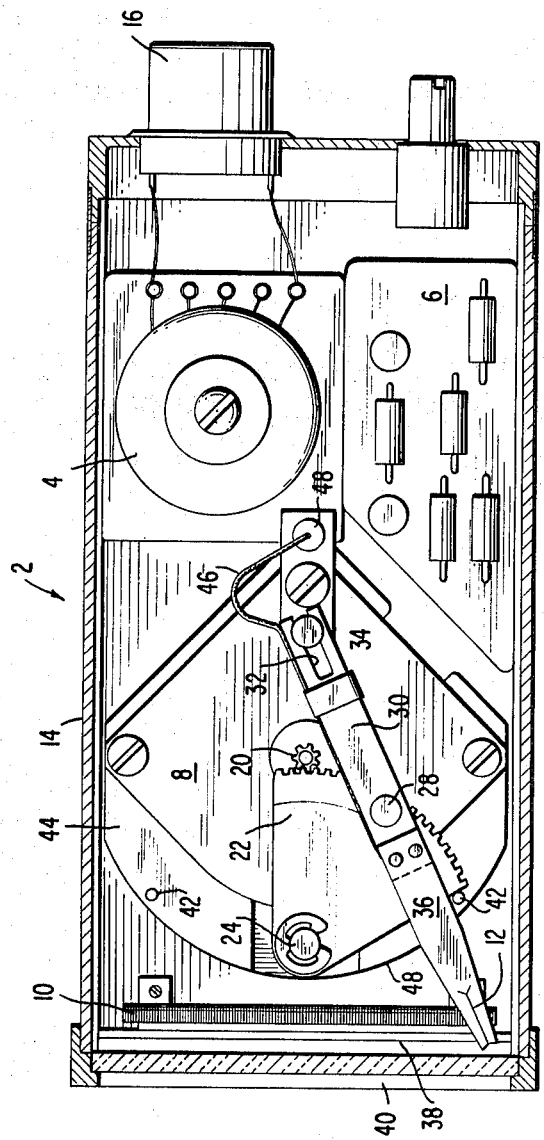
FIG. 1 is a plan view of the device showing a linkage mechanism employing the principles of this invention.

Referring now to FIG. 1, there is shown a servo instrument 2 of the feedback loop type. The servo 2 is of compact design and is made up of conventional components in a printed circuit form, for example, a transformer 4 preferably of the toroidal type, an amplifier bridge network 6, a rebalancing torque motor 8, a rebalancing potentiometer 10 preferably of the card type, and a wiper arm 12, which form part of the indicator arm to be described below. The circuitry is of conventional design such as shown in U.S. Pat. No. 2,981,105, issued to F.L. Ryder on Apr. 25, 1961. It is also within the concept of this invention to employ the circuit described in the copending application referred to above.

Figure 2:
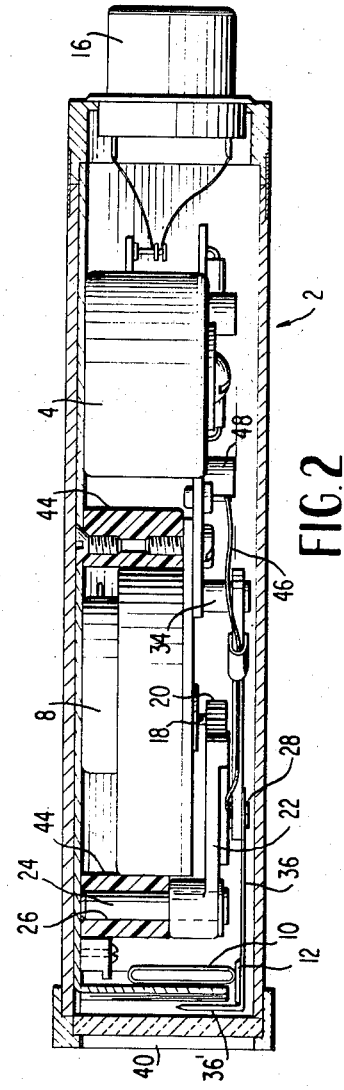
FIG. 2 is a side elevational view showing the component parts illustrated in FIG. 1.
Figure 3:
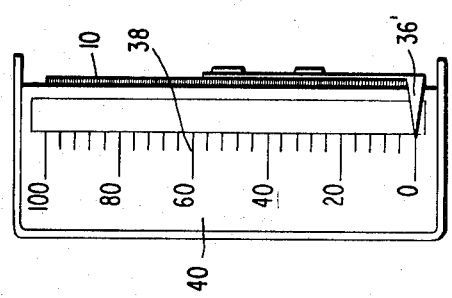
FIG. 3 is a front elevational view showing the flat dial surface and the potentiometer wiper and pointer cooperating therewith.

The component parts are arranged in a compact manner within a casing 14 which has a suitable electrical receptacle 16 located at the rear thereof. The torque motor 8 is provided with an output shaft 18, as best shown in FIG. 2, and fixedly mounted thereon is a pinion 20 which is in meshing engagement with a gear sector 22. The latter is mounted for rotation about a pin member 24 which is secured to a suitable bushing 26, as best shown in FIG. 2. The gear sector 22 has an arcuate length which allows it to oscillate through an operating angle of 50°. This arcuate length, however, may be varied to vary the operating angle of oscillation depending upon the physical characteristics of the servo unit 2. Located on the gear sector 22 and in close proximity to the gear teeth and bisecting the angle formed by the gear sector is a crankpin 28 which rotatably supports an indicator arm 30, as best shown in FIG. 1. One end of the pointer arm is provided with lost-motion connection, such as a groove or a slot 32, as shown, for engaging a fixed pin 34 such that it can slide along the latter. The opposite end of the indicator arm 30 has attached thereto a thin tapered strip of precious metal 36 which may be composed of gold, platinum alloy or the like. The forward end of the tapered strip contains a thickened portion of the same material, as best shown in FIG. 2, and is bent to form a right angle pointer 36', the latter of which functions as a pointer over an indicia bearing flat surface scale 38. Adjacent to the pointer 36' the thickened portion of the strip 36 forms the potentiometer wiper 12, referred to above, for contacting the potentiometer 10, as best shown in FIG. 2. A suitable window glass 40 is secured to the front of the casing 14 thereby affording visibility to the dial 38 as well as to protect the same. The latter arrangement is best shown in FIG. 3 where the pointer 36' is shown juxtaposed against the flat scale surface 38.

To limit the arcuate swing of the gear sector 22 there are provided suitable mechanical stops 42 protruding from a mounting ring of molded plastic 44 which supports the bushing 26 and surrounds the motor 8, as best shown in FIG. 2. The card-type potentiometer resistance element 10 is located in close proximity to the sector gear axis through the pin 24 and lies in a plane which is perpendicular to, and bisected by an imaginary line drawn through the sector gear axis and fixed pin 34 on which the indicator arm 30 is guided. A suitable wire 46 connects the wiper portion 12 of the arm 30 to a suitable terminal 48 provided for that purpose. In operation, when the pinion 20 rotates due to rotation of the output shaft 18 from the motor 8, a cranking motion is imparted to the indicator arm 30 through an angle of 50°. In a relatively short guideway the reciprocating output stroke is large, and the output motion approaches that of a true straight line and true harmonic motion. In this way the pointer arm provides a linear dial display reflecting the particular input parameters to the servo loop feedback potentiometer system, and because the dial pointer 12, which functions as the potentiometer wiper and the feedback potentiometer 10 are in such close proximity to each other, the lost motion is minimal and introduces only negligible inaccuracies. Further, with these arrangements two revolutions of the motor shaft will correspond to a full scale displacement of the pointer, thus resulting in low motor inertia and minimum overshoot and hunting tendency.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

What is claimed is:

1. An indicating device for converting rotary motion to translatory motion, the combination comprising: a rotary output means having a pinion means connected thereto, a sector gear means in meshing engagement with said pinion means, means pivotally mounting said sector gear means, a fixed-pin means mounted in line with said last-named means and said pinion means, an indicator arm rotatably mounted on said sector gear means medially of the arc thereof, said indicator arm having a pointer at one end and a lost-motion connection means at the other end engaging said fixed-pin means, and an indicia-bearing flat surface member adjacent said pointer for cooperation therewith, whereby said pointer is caused to move in a straight line parallel with said flat surface member in response to rotation from said rotary output means.

2. In an indicating device converting rotary motion to translatory motion, the combination comprising: a rotary output means having a pinion means connected thereto, a sector gear means in meshing engagement with said pinion means, means pivotally mounting said sector gear means, a fixed-pin means positioned in line with said last-named means and said pinion means, an indicator arm pivotally mounted on said sector gear means on an axis bisecting the angle formed by said sector gear means, said indicator arm having a pointer at one end for cooperation with an indicia-bearing flat surface member and a lost-motion connection means at the other end engaging said fixed-pin means, said indicia-bearing flat surface member being perpendicular to and bisected by an axis passing through said fixed-pin member and said means for pivotally mounting said sector gear means, whereby said pointer is caused to move in a straight line parallel to said flat surface member in response to rotation of said rotary output means.

* * * * *